July 15, 1930.   J. A. COSTELLO   1,770,570
HOSE AND PIPE COUPLING
Filed Dec. 17, 1926
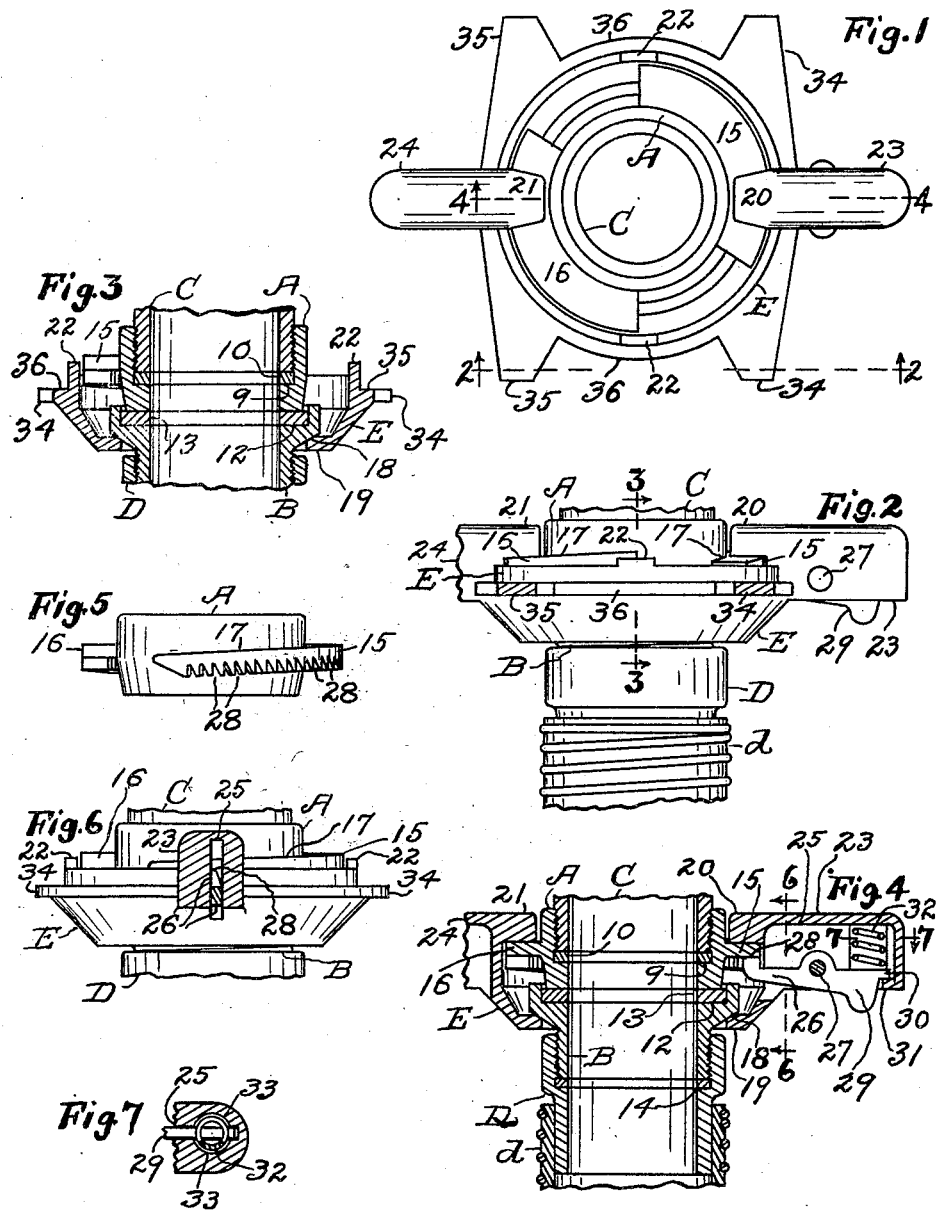
Inventor:
Joseph A. Costello
By [signature]
his Attorney.

Patented July 15, 1930

1,770,570

UNITED STATES PATENT OFFICE

JOSEPH A. COSTELLO, OF CLEVELAND, OHIO, ASSIGNOR TO THE CLEVELAND BRASS MANUFACTURING COMPANY, OF CLEVELAND, OHIO, A CORPORATION OF OHIO

HOSE AND PIPE COUPLING

Application filed December 17, 1926. Serial No. 155,415.

This invention relates to a hose and pipe coupling more especially adapted for use in an upright position and comprising a tubular coupling-member having external flanges, a tubular coupling-member arranged opposite one end of and in line endwise and communicating with the first-mentioned coupling-member, a rotatable sleeve arranged externally of said coupling-members and capable of the required movement toward the opposite end of said first-mentioned member when the second-mentioned coupling-member is loose in relation to said first-mentioned member, with the second-mentioned coupling-member and the sleeve having means whereby said movement of the sleeve results in shifting said coupling-member into fluid-tight relation to the first-mentioned member, with the sleeve and aforesaid flanges having means whereby said movement of the sleeve occurs during the required rotation of the sleeve in one direction, and with the sleeve releasably held against rotation in the opposite direction.

One object of this invention is to produce a coupling of the character indicated which is exceedingly simple, durable, highly practical and reliable, and particularly well adapted to withstand careless handling and rough treatment without liability of distorting or materially damaging the hereinbefore mentioned sleeve.

Said coupling is illustrated in the accompanying drawings in which Fig. 1 is a top plan of an upright coupling and shows the upper member of the coupling as attached to a downwardly discharging spout or fluid-delivering member shown in transverse section. Fig. 2 is a side view and section taken along the dashed line 2—2 in Fig. 1 and shows the lower member of the coupling held in place in relation to the upper coupling-member and also shows the connection of a hose to said lower member. Fig. 3 is a central vertical section taken along the dashed line 3—3 in Fig. 2. Fig. 4 is a central vertical section taken along the dashed line 4—4 in Fig. 1. Fig. 5 is a side view of the upper coupling-member detached. Fig. 6 is a vertical section taken along the dashed line 6—6 in Fig. 4. Fig. 7 is a horizontal section taken along the dashed line 7—7 in Fig. 4.

The illustrated coupling (see Figs. 2, 3 and 4) comprises two upright fluid-conducting tubular coupling-members A and B which are in line endwise and in open relation with each other and preferably made of brass, and the member B is arranged under the member A.

The lower end portion of the upper coupling-member A (see Figs. 3 and 4) has an upwardly facing annular internal shoulder 9 on which is seated a washer 10, and said coupling-member is internally screw-threaded above said washer and screwed onto and rendered rigid with the downwardly discharging end portion C of a spout or tubular member for delivering liquid or fluid. The upper end portion of the lower coupling-member B is larger in external diameter than the remainder of said member and has an annular internal recess 12 formed at the upper extremity of said member and containing a gasket 13. The lower portion of the lower coupling-member B is externally screw-threaded so as to permit the screwing, onto said member, of an internally screw-threaded tubular metal piece D embraced by a hose d employed in conducting liquid or fluid from the coupling to the place desired. A washer 14 (see Fig. 4) is seated internally of the hose-embraced piece D and next below the lower coupling-member B. The top surface of the gasket 13 constitutes the upper end face of the lower coupling-member B and is arranged opposite and concentric in relation to and covers the lower end face of the upper coupling-member A.

The upper coupling-member A (see Figs. 1, 2, 4 and 5) has two substantially diametrically opposite corresponding external flanges 15 and 16 spaced substantially correspondingly upwardly from the lower end face of said coupling-member and also spaced and extending circumferentially of said coupling-member and also extending somewhat endwise of said coupling-member. Each of said flanges (see Fig. 2) has an upwardly facing sloping top surface 17, and the sloping surfaces 17 of said flanges extend correspondingly circumferentially and endwise of said upper coupling-member. The upper coupling-member A and the upper portion of the lower coupling-member B are surrounded by an upright rotatable sleeve E preferably made of brass and arranged wholly externally of said coupling-members A and B. Said sleeve extends opposite and is loose in relation to the circumferential edges of the flanges 15 and 16, as shown in Figs. 1, 3 and 4. A laterally outwardly and downwardly facing and preferably segmentally spherical annular shoulder 18 (see Figs. 3 and 4) is formed on and externally of the upper portion of the lower coupling-member B, and the sleeve E is provided, at its lower end, with an annular internal flange 19 extending opposite the outer portion of said shoulder and arranged to constitute an annular seat for said shoulder.

The sleeve E (see Figs. 1, 2 and 4) has two substantially diametrically opposite lugs 20 and 21 seated on the sloping top surface 17 of opposite flanges 15 and 16 respectively, and said flanges are spaced farther apart circumferentially of the coupling than said lugs extend circumferentially of the coupling.

In assembling the component parts of the coupling, the sleeve E, after the assemblage of the sleeve and lower coupling-member B, is placed under and in such relation to the upper coupling-member A that the lugs 20 and 21 can enter diametrically opposite spaces respectively between the flanges 15 and 16. Then the sleeve E, supporting the lower coupling-member B, is raised as required to bring said lower coupling-member into close relation to the upper coupling-member A, and then the sleeve is rotated as required to bring its lugs 20 and 21 onto the flanges 15 and 16 respectively.

The sleeve E (see Figs. 1, 3 and 6) has two substantially diametrically opposite upwardly projecting centering members 22 arranged substantially equidistantly from the axis of the sleeve and spaced from the lugs 20 and 21, and the flanges 15 and 16 extend opposite and in proximity to the inner side of opposite upwardly projecting members 22 respectively and are therefore arranged to cooperate with said members 22 in centering the sleeve in relation to the upper coupling-member during the assemblage of the parts.

Obviously the sleeve E is capable of upward movement independently of the upper coupling-member A when the lower coupling-member B is loose in relation to the upper coupling-member, and the shoulder 18 of the lower coupling-member and the flange 19 of the sleeve constitute means whereby the required upward movement of the sleeve results in upward shifting of the lower coupling-member into fluid-tight engagement at its gasket 13 with the upper coupling-member, and the flanges 15 and 16 of the upper coupling-member are spaced far enough upwardly from the lower coupling-member to permit upward shifting of the lower coupling-member for the purpose of taking up wear at the joint formed between said coupling-members. The lugs 20 and 21 of the sleeve and the sloping top surfaces 17 of the flanges 15 and 16 of the upper coupling-member constitute means whereby, when the lower coupling-member is loose in relation to the upper coupling-member, the required upward movement of the sleeve occurs during the required rotation of the sleeve.

The sleeve E (see Figs. 1, 2 and 4) has two handles 23 and 24 for convenience in rotating the sleeve. The handles 23 and 24 are integral with and extend outwardly from the lugs 20 and 21 respectively and are therefore arranged at opposite sides respectively of and preferably radially in relation to the sleeve and in line endwise. The handle 23 has an interior chamber 25 which (see Fig. 4) extends to the bottom of the handle and from within the outer end portion of the handle to the adjacent portion of the internal surface of the sleeve E. A pawl 26 (see Fig. 4) is pivoted, as at 27, substantially horizontally and transversely of and to the central portion of the handle 23 near the bottom of the handle. Said pawl extends endwise of the chamber 25 and is adequately spaced from the lower coupling-member B to permit the required limited movement of the pawl and, of course, the sleeve E is internally contoured adjacent the pawl as required to permit said movement of the pawl. Said pawl normally engages a notch of a series of substantially corresponding notches 28 formed in the botton of the flange 15 of the upper coupling-member and extending to the circumferential edge of said flange. The upper coupling-member A is shown detached in Fig. 5, and the notches 28, as shown in Fig. 5, are spaced circumferentially of said upper coupling-member and therefore circumferentially of the axis of the sleeve E.

The pawl 26 (see Fig. 4) has an arm 29 extending toward the outer end of the pawl-carrying handle and having a member 30 arranged over a shoulder 31 formed on and internally of the outer end portion of said handle. Said pawl is preferably made of steel, and an upright coiled spring 32 is arranged between the axis of the pawl and the outer end of the chamber 25. Said spring is confined between said arm and the top wall of said chamber and acts to retain the pawl in its normal and operative position in which the member 30 of said arm engages the shoulder 31. The chamber 25 (see Fig. 7) is enlarged laterally, as at 35, to provide adequate room for the spring 32.

Preparatory to reestablishing fluid-tight relation between the coupling-members A and B, when the lower coupling-member B is loose in relation to the upper coupling-member A, the handles 23 and 24 are manually grasped and at the same time the pawl 26 is withdrawn from the notch 28 engaged thereby. Then the sleeve E is rotated in the direction required for effecting upward movement of the sleeve and for removing the withdrawn pawl toward the higher end of the flange 15 from opposite said notch to and opposite the next succeeding notch in said flange, or as much farther as may be required. The notched bottom of said flange slopes to substantially correspond with the slope of the top surface 17 of the flange, as shown in Fig. 5, so that the withdrawn pawl remains disengaged from said flange during the aforesaid upward movement of the sleeve and until said pawl is again permitted to engage a notch in said flange after the required rotation of the sleeve in the aforesaid direction, and obviously the sleeve is releasably held against rotation in the opposite direction when the pawl engages a notch in said flange.

Sleeve E (see Fig. 1) is provided, adjacent pawl-bearing handle 23, with a pair of reinforcing projections 34 which are arranged at opposite sides respectively and adjacent the bottom of and contiguous to the inner end portion of said handle, and said projections extend laterally outwardly from and laterally brace said portion of said handle. Also, sleeve E is provided, adjacent handle 24, with a pair of reinforcing projections 35 which laterally brace said handle 24 and are arranged at opposite sides respectively and adjacent the bottom of and contiguous to the inner end portion of said handle 24.

Adjacent projections 34 and 35 are connected together by a reinforcing web 36 which is formed on and externally of sleeve E and extends circumferentially of the sleeve between said projections. Said adjacent projections 34 and 35 extend not only laterally outwardly but substantially equidistantly in the same direction and farther in said direction than any portion of the sleeve between said projections so that, were the coupling carelessly dropped onto or dragged over a concrete floor or pavement, said projections would serve to prevent contact with said floor or pavement by any portion of the sleeve between said projections. It will be observed, therefore, that projections 34 and 35 materially strengthen the handles of sleeve E and serve to prevent distortion of the sleeve when the coupling is subjected to rough treatment.

It will also be observed that the inner end portion of each handle of the sleeve is reinforced by a pair of projections 34 and 35 contiguous to opposite sides respectively of said portion of the handle, and that said projections are arranged adjacent and above the bottom of said portion of said handle so as to insure adequate strengthening of the handle at the sides and adjacent the bottom of said portion of the handle.

What I claim is:—

A coupling comprising a first coupling-member having external flanges, a second coupling-member arranged adjacent one end of the first-mentioned member, and a rotatable sleeve extending circumferentially of said members and movably mounted on the second coupling-member for engaging the first coupling-member and having two handles arranged at its opposite sides, the second-mentioned coupling-member and the sleeve having interengaged shoulders whereby rotation of the sleeve in the proper direction results in shifting said coupling-member into fluid-tight relation to the first-mentioned member, the aforesaid flanges and the sleeve having means whereby said movement of the sleeve occurs during the required rotation of the sleeve in one direction, the sleeve being normally releasably held against rotation in the opposite direction and provided at each handle with a pair of reinforcing projections which are arranged at opposite sides respectively and adjacent the bottom of and contiguous to the inner end portion of said handle and extend laterally outwardly farther than any portion of the sleeve between the two pairs of projections.

In testimony whereof, I sign the foregoing specification.

JOSEPH A. COSTELLO.